A. L. FOREMAN.

BOTTLE FILLING MACHINE.

APPLICATION FILED JAN. 4, 1913.

1,170,232.

Patented Feb. 1, 1916.

2 SHEETS—SHEET 1.

WITNESSES

Hamilton D. Turner

Elsie Fullerton

INVENTOR

AMOS L. FOREMAN

BY HIS ATTORNEY

Harry Smith

A. L. FOREMAN.

BOTTLE FILLING MACHINE.

APPLICATION FILED JAN. 4, 1913.

1,170,232.

Patented Feb. 1, 1916.

2 SHEETS—SHEET 2.

WITNESSES

Hamilton D. Turner

Elsie Fullerton

INVENTOR

AMOS L. FOREMAN

BY HIS ATTORNEY

Harry Smith

UNITED STATES PATENT OFFICE.

AMOS L. FOREMAN, OF BALTIMORE, MARYLAND.

BOTTLE-FILLING MACHINE.

1,170,232. Specification of Letters Patent. Patented Feb. 1, 1916.

Application filed January 4, 1913. Serial No. 740,115.

*To all whom it may concern:*

Be it known that I, AMOS L. FOREMAN, a citizen of the United States, residing in Baltimore, Maryland, have invented certain Improvements in Bottle-Filling Machines, of which the following is a specification.

The object of my invention is to so construct a bottle filling machine as to dispense with the use of valves therein, to provide for the accurate filling of each bottle, and to prevent the formation of foam during the filling operation.

The machine has been devised especially for the filling of milk bottles, and will be described as such, although it is applicable for filling bottles with any non-effervescing liquid.

Figure 1:
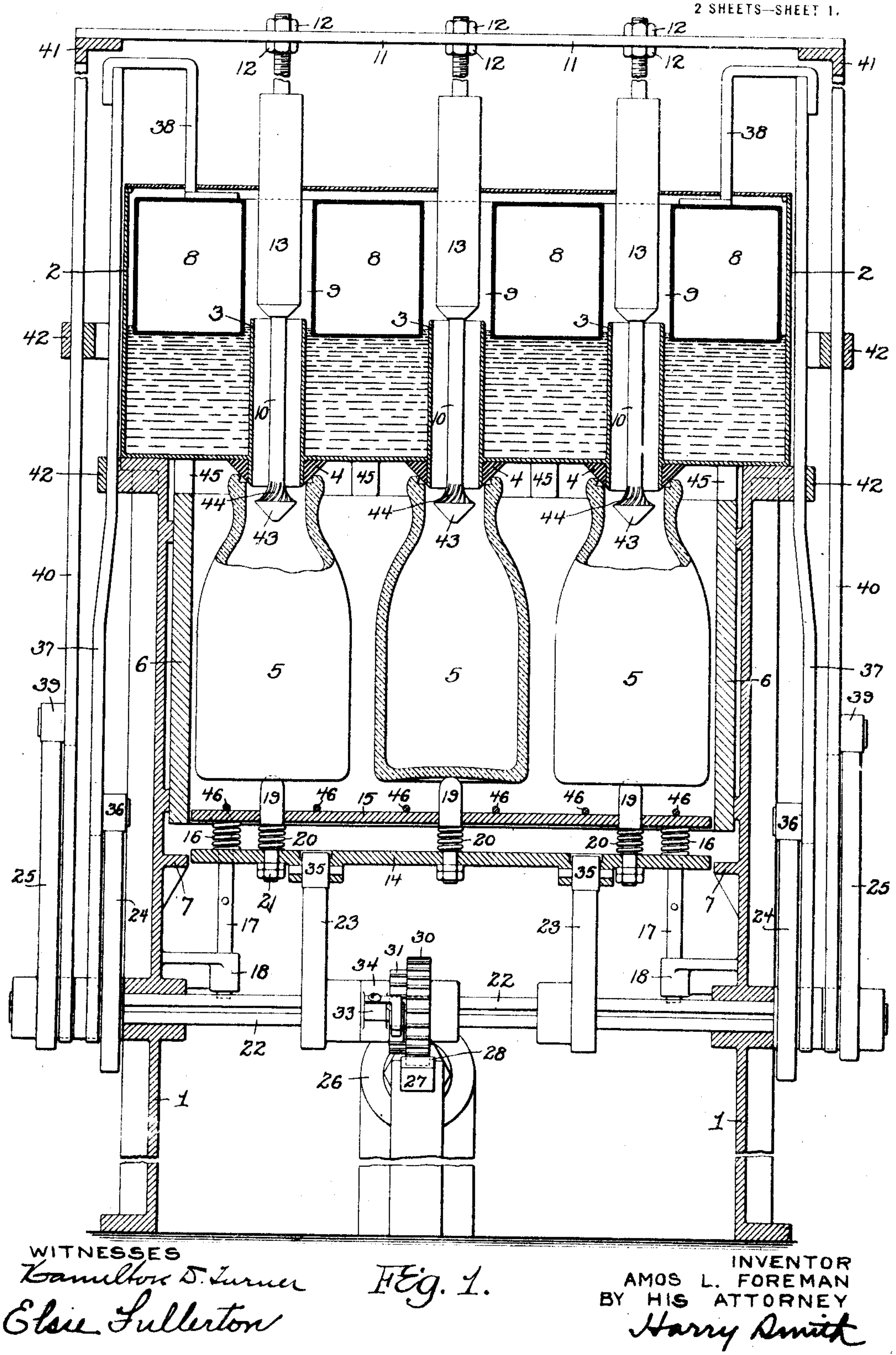
Figure 2:
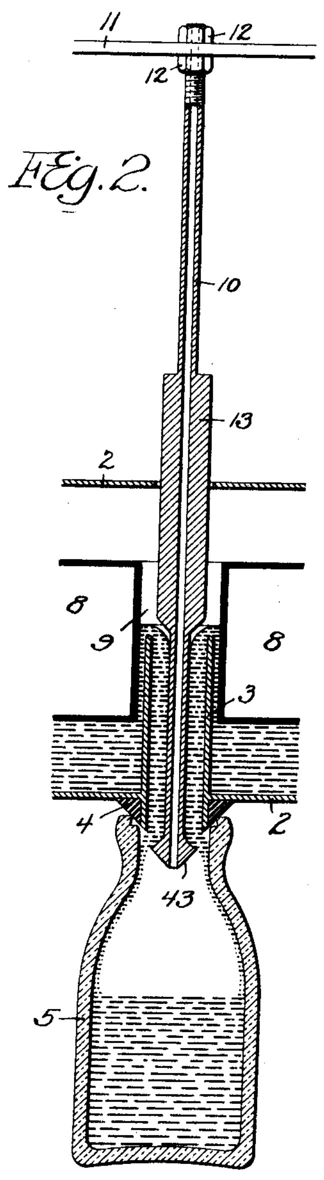
Figure 3:
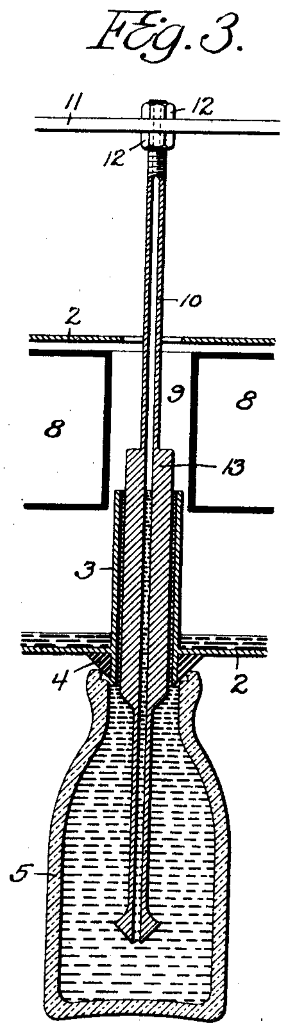
Figure 4:
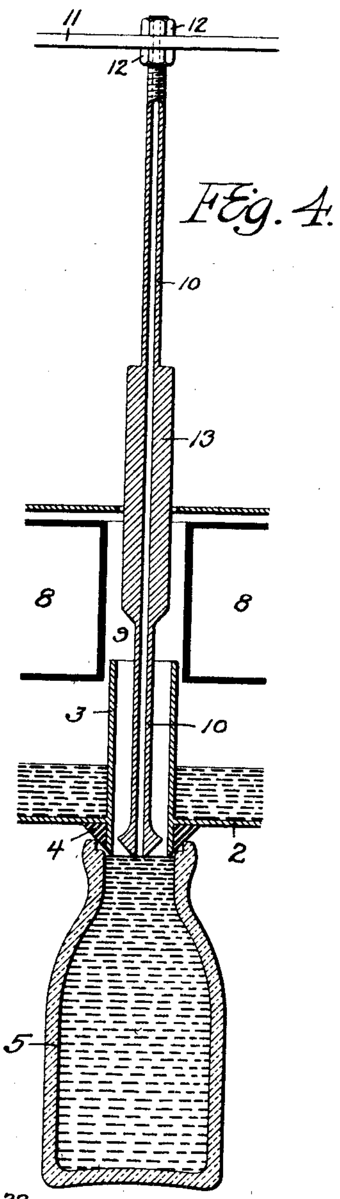
Figure 5:
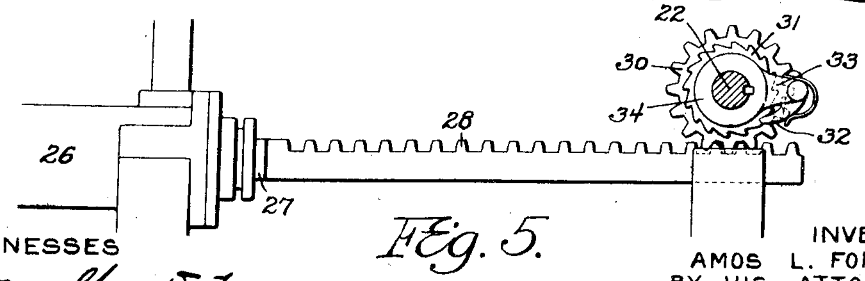

In the accompanying drawings, Figure 1 is a transverse section of a bottle filling machine constructed in accordance with my invention; Figs. 2, 3 and 4 are views illustrating successive positions of the parts during the filling operation, and Fig. 5 is a side elevation of parts of the operating mechanism of the machine.

Referring in the first instance to Fig. 1 of the drawing, 1—1 represent suitable side frames upon which is mounted a tank 2 for receiving the milk. The supply pipe for this tank should be provided with a float valve or equivalent means for preventing the rise of the milk in the tank above a predetermined level.

Projecting upwardly from the bottom of the tank are a series of tubes 3 which extend above the normal level of milk in the tank and also project downwardly from the bottom of the tank, such downwardly projecting portion of each tube being surrounded by a gasket 4 of rubber or other elastic material. The tank contains as many of the tubes 3 as there are bottles to be filled at one operation, the bottles 5 being disposed as usual in a crate 6, which is fed longitudinally through the machine in a horizontal direction by any suitable intermittently acting mechanism, the crates, during their travel through the machine, resting upon rails 7 which project inwardly from the side frames 1.

Within the tank is a displacement structure 8, which may be composed of metal of hollow box-like form, as shown in Fig. 1, or may be a solid structure composed of wood or other available material, this structure almost completely filling the tank but having in it vertical openings 9 extending from top to bottom, and intended for the reception of the tubes 3. Rising and falling movement, within the tank 2, is imparted to the displacement structure 8 by mechanism hereinafter described.

Axially disposed within each of the tubes 3 of the machine is a vent tube 10, each row of these tubes being mounted upon a bar 11 at the top of the machine, so that it can be adjustable vertically in respect to said bar, such vertical adjustment being effected in the present instance by threading the upper end of the tube and applying thereto nuts 12, one above and the other beneath the bar 11.

Surrounding or forming part of each of the tubes 10 is a displacement cylinder 13, of such diameter in respect to the internal diameter of the corresponding tube 3, that, when it is forced downwardly into the latter, it will permit the liquid to rise freely between the tube and the displacement cylinder.

Disposed directly beneath each crate, when the latter has been moved to its proper position in the machine, is a platform 14, whose dimensions are slightly less than the internal dimensions of the crate, and above said platform 14 is a supplementary platform 15 of like dimensions, said platform 15 being yieldingly supported upon the platform 14 by means of coiled springs 16, which surround guide rods 17, the latter being secured to the platform 15 but passing through openings in the platform 14 and through suitable guide brackets 18 projecting inwardly from the side frames 1.

The platform 14 carries a series of studs 19, one for each of the bottles contained in the crate, each of these studs being centrally disposed in respect to its corresponding bottle and said studs being yieldingly supported upon the platform 14 by means of coiled springs 20, the stems of the studs passing through openings in the platform 14 and being provided with nuts 21 which, by contact with the under side of the platform, limit the projection of the studs above said platform.

To suitable bearings in the lower portions of the side frames 1 is adapted a transverse shaft 22 carrying three pairs of cams 23, 24 and 25 to which intermittent movements of rotation are imparted at predetermined intervals by means of a power cylinder 26 (Fig. 5), said cylinder containing a piston with rod 27, terminating at its outer end in a rack 28, which rack is in engagement with a spur wheel 30 mounted so as to rotate freely upon the shaft 22 and having secured to one face of it a ratchet wheel 31 with which engages a spring pressed pawl 32 carried by an arm 33 on a hub 34, the latter being keyed or otherwise secured to the shaft 22 so as to rotate therewith.

The cams 23 act upon anti-friction rollers 35 whose shafts are mounted in suitable bearings on the platform 14. The cams 24 act upon anti-friction rollers 36 carried by bars 37, the lower ends of these bars being slotted so as to straddle the hubs of the cams 24 and thus be guided in their vertical movements. The upper ends of the rods 37 are connected by yokes 38 to the top of the displacement structure 8. The cams 25 act upon anti-friction rollers 39 mounted upon rods 40 which, like the rods 37, are slotted at their lower ends so as to straddle the hubs of the cams 25, the upper ends of said rods 40 being connected to angle bars 41 which carry the transverse bars 11 upon which the vent tubes 10 are mounted.

The cams 23 are so formed as to impart rising and falling movement to the platform 14 with a dwell at both the upper and lower terminations of said movement, and the cams 24 and 25 are so formed as to impart rising and falling movement to the bars 37 and 40, respectively, with a dwell at the upper termination of such movement. Suitable studs 42 on the side frames of the machine serve to aid in the proper vertical guidance of the rods 37 and 40.

At the lower end of each of the vent tubes 10 is a reversely coned flange 43, the upper surface of this flange being provided with spirally disposed ribs or grooves 44, as shown in Fig. 1.

Depending from the bottom of the tank 2 are studs 45 which, by contact with the top faces of the sides and ends of the crates 6 serve to limit the rise of said crates when the mouths of the bottles contact with or are slightly below the gaskets 4 on the bottom of the tank.

The operation of the machine is as follows: In the normal or inoperative position the displacement structure 8 and the vent tubes 10 occupy their fully elevated position, as shown in Fig. 1, and the platform 14 occupies its fully lowered position, which is such that the upper ends of the studs 19 will be below the lower edge of a crate resting upon the rails 7, so that they will not interfere with the free movement of said crate into its proper position beneath the filling devices with each bottle in line vertically with its corresponding tube 3 of the filling tank. The platform 14 is first raised by the action of the cams 23 until the supplementary platform 15 comes into contact with the wires 46 or other structure constituting the bottom of the crate, whereupon said crate with its bottles will partake of the lifting movement of said supplementary platform 15 until the top face of the crate comes into contact with the depending lugs 45, whereupon lifting movement of the crate will be arrested, further lifting movement of the platform 14 compressing the springs 16 which serve to maintain the top of the crate in contact with the lugs 45 during the time that said crate remains in the elevated position. If the described upward movement of the crate has not caused the mouths of the bottles contained in the crate to contact with and be sealed by the resilient gaskets 4 those bottles whose mouths are still below the gaskets will continue to be raised by the spring-supported studs 19, any upward movement of the platform 14 after the mouth of a bottle has contacted with its corresponding gasket 4 causing a depression of the corresponding stud 19 and a compression of its supporting spring 20, which thus serves to maintain the mouth of the bottle firmly in contact with its corresponding gasket 4 during the time that the crate is held in the elevated position. By this means proper compensation is provided for differences in the height of different bottles contained in the crate, and the proper sealing of the mouth of each bottle is insured before the milk is permitted to enter the same. The various parts being now in the position shown in Fig. 1 the displacement structure 8 is, by the action of the cams 24, caused to descend into the body of milk contained in the tank 2 and to displace the same, the displaced milk flowing over the tops of the tubes 3 and down through the latter into the bottles. Just as it is about to enter the bottle the milk is subjected to the action of the spiral ribs on the upper face of the flange 43 at the lower end of the vent tube 10, and is thereby divided into a number of streams which are thrown outwardly against the inner wall of the bottle in a tangential or transverse direction and are thus caused to descend in a spiral course in contact with said inner wall of the bottle and are thereby subjected to such frictional retardation that they will not forcibly enter the body of milk in the bottle, there being no direct drop of the milk into the bottle, and consequently no such splashing action as occurs when the milk enters the bottle in that way, the result being that the foaming of the milk will be moved [illegible] to [illegible]. As soon as the proper volume of milk has been displaced in the bottles by the descent of the displacement [illegible] through the [illegible] the [illegible] by reason of the [illegible] into the [illegible] the [illegible] of the displacement [illegible].

[illegible] it possible for the free escape of air [illegible] bottles, as shown in Fig. 2, but the [illegible] of milk [illegible] for the [illegible] to more than fill the bottles up to the desired level.

During or after the rise of the structure the vent tubes 10, with their displacement cylinders 13 are caused to descend, thereby displacing the greater portion of the milk contained in the tubes 3 and also a portion of the milk contained in the upper portion of each bottle [illegible] a portion of the milk thus displaced [illegible] tubes 10 and the remainder being [illegible] over the top of the tubes 3 and [illegible] the tank. As soon as the required amount of milk has been [illegible] 10 and the [illegible] caused to [illegible] platform 11 [illegible] lower the [illegible] thereon, any of the [illegible] which have been lifted above the bottom of the crate being first lowered into position [illegible] bottom by reason of the fact that the [illegible] 12 will be withdrawn while the [illegible] porting platform 11 [illegible] springs 16, the [illegible] the platform 14 being to lower the intermediary platform 11 and the [illegible] ed thereby until [illegible] upon the supporting rails [illegible]. During the [illegible] of the bottles and the ascent of the vent tubes to the position shown in Fig. 4 the milk contained in said vent tubes [illegible] spaces between the [illegible] of [illegible] 13 and tubes 3 [illegible] into the bottles and takes the place of that part of the bottle-contained milk which was displaced by the vent tubes and displacement cylinders when the latter occupy the position shown in Fig. 3, the result being that each bottle, as it leaves the machine, will be filled with milk up to the proper predetermined level. The vent tubes are lowered from the fully raised position shown in Fig. 4 to the filling position shown in Fig. 2 prior to a repetition of the operations above described. During the time that the crate of filled bottles is being moved forward from beneath the filling devices and a crate of empty bottles is being [illegible] for [illegible] of the [illegible] said shaft [illegible]. [illegible] designed [illegible] backward [illegible] of [illegible] and [illegible] shaft 22, [illegible] to [illegible] stroke [illegible] crate is in [illegible].

[illegible]

1. The [illegible] bottle filling machine [illegible] through which the bottles are filled [illegible] displacement structure whereby [illegible] is caused to [illegible] through said [illegible] with each filling tube [illegible] movable bodies of [illegible] the vent tubes and [illegible] filling tubes and [illegible].

2. The combination [illegible] bottle filling machine [illegible] tubes through which the bottles are filled [illegible] displacement structure whereby [illegible] in the tank is caused [illegible] through said tubes, vent [illegible] tube in said filling tubes, and bodies carried by and of larger diameter than said vent tubes and movable into and out of the filling tubes as the vent tubes are lowered into and withdrawn from the bottles.

3. The combination in a bottle filling machine, of a tank having tubes through which the bottles are filled, a displacement structure whereby the liquid in the tank is caused [illegible] through said tubes, [illegible] vent tubes in said [illegible] tubes, and bodies carried by and of larger diameter than said vent tubes and [illegible] with the same, said bodies being located above the lower ends of the vent tubes at a distance equal to the height of the filling tubes.

4. The combination of the filling tube of a bottle filling machine with a spirally grooved deflector located below the delivery end of said tube so as to cause the incoming flow of liquid to be thrown in the form of tangentially directed streams against the inner wall of the bottle, whereby the frictional retarding effect upon the descent of the streams is increased, and the forcible plunge of said streams into the body of milk in the bottle is prevented.

5. The combination, in a bottle filling machine, of bottle filling devices, a main lifting platform, means for raising the same, a supplementary crate lifting platform yieldingly mounted on said platform, and bottle lifting devices independent of the crate lifting platform and also yieldingly mounted upon said main platform.

In testimony whereof, I have signed my name to this specification, in the presence of two subscribing witnesses.

AMOS L. FOREMAN.

Witnesses:
ELSIE FULLERTON,
HAMILTON D. TURNER.